(12) United States Patent
Clarke

(10) Patent No.: US 6,662,575 B2
(45) Date of Patent: Dec. 16, 2003

(54) CONDITIONING OF AIR SUPPLY

(75) Inventor: John Alistair Clarke, Yeovil (GB)

(73) Assignee: Honeywell Normalair-Garrett Limited, Yeovil (GB)

( * ) Notice: Subject to any disclaimer, the term of this patent is extended or adjusted under 35 U.S.C. 154(b) by 0 days.

(21) Appl. No.: 10/214,242

(22) Filed: Aug. 6, 2002

(65) Prior Publication Data
US 2003/0029177 A1 Feb. 13, 2003

(30) Foreign Application Priority Data
Aug. 11, 2001 (GB) .............................. 0119658

(51) Int. Cl.⁷ .............................. F28B 9/00; F25D 9/00
(52) U.S. Cl. .............................. 62/87; 62/172; 62/403; 62/DIG. 5
(58) Field of Search .............................. 62/172, 403, 87, 62/DIG. 5, 401, 402; 165/121

(56) References Cited

U.S. PATENT DOCUMENTS

| 3,764,814 | A | * | 10/1973 | Griffith | 290/40 |
| 5,600,965 | A | | 2/1997 | Jan et al. | 62/401 |
| 5,709,103 | A | | 1/1998 | Williams | 62/402 |
| 5,899,085 | A | * | 5/1999 | Williams | 62/236 |
| 6,058,715 | A | | 5/2000 | Strang et al. | 62/87 |
| 6,189,324 | B1 | * | 2/2001 | Williams et al. | 62/172 |
| 6,408,641 | B1 | * | 6/2002 | Skur, III | 62/401 |

* cited by examiner

Primary Examiner—Marc Norman
(74) Attorney, Agent, or Firm—MacMillan, Sobanski & Todd, LLC

(57) ABSTRACT

A method and apparatus for conditioning a supply of bleed air from an aircraft engine to a system using such bleed air, including passing the bleed air to a turbine over which the air is expanded to produce a power output, and regulating the power output thereby to control the condition of the air downstream of the turbine.

12 Claims, 1 Drawing Sheet

CONDITIONING OF AIR SUPPLY

BACKGROUND TO THE INVENTION

This invention relates to a method of conditioning a supply of bleed air from an aircraft engine to an apparatus or system using such bleed air, to provide such air in a required condition.

In referring herein to an aircraft engine it is to be understood that engines of the turbine type generally used for military or commercial civil aircraft may also be used in propulsion systems for other means of transport, and the invention is applicable to such other uses of the engines, as well as to their use in aircraft. Further, in relation to aircraft, we include all types thereof whether heavier or lighter than air and manned or unmanned.

The term bleed air as generally understood and as used herein refers to pressurised air which is extracted from an aircraft engine after a or the compressor stage thereof.

It is well known for most types of military and civilian aircraft to utilise bleed air from the aircraft's engine(s) for air conditioning and other purposes. Having been compressed in the engine(s) the bleed air is normally much too hot to be used directly and therefore has to be thermally conditioned by passing it through at least one heat exchanger. Conventionally the cooling medium in such a heat exchanger is ram air, i.e. ambient air caused to flow through the heat exchanger as a result of the forward speed of the aircraft.

Such use of ram air to cool the bleed air has certain disadvantages. One is that the structure of the aircraft has to be designed to provide a ram air inlet or inlets, which sometimes have to be provided with adjustable doors or shutters to vary the size of the opening they afford: this entails the provision of actuators and controls. Also the internal structure of the aircraft has to provide space for the ram air to pass to and from the heat exchanger. Improvements in heat exchanger design and efficiency has enabled the size of heat exchangers to be reduced, but the use of ram air nevertheless creates aerodynamic drag on the aircraft, adversely affecting speed and fuel consumption. A further disadvantage pertaining to military aircraft is that compression of air at or in front of a ram air inlet opening creates a "hot spot" which can be detected by infrared-seeking anti-aircraft missiles.

An alternative to the use of ram air, particularly in civil aircraft, is the use of low-pressure air impelled by a fan stage of the engine as the cooling medium, to cool the bleed air in a heat exchanger. Heated fan air downstream of the heat exchanger is discharged overboard.

Whether ram air or fan air is used in a heat exchanger to reduce the temperature of compressor bleed air, a lot of power is wasted by the discharge overboard of heated air. Under certain conditions, possibly 300 kW might be wasted in the discharge of heated air. This also is a disadvantage in the case of military aircraft, since a hot outflow of air can be detected by a heat seeking missile. There are devices whereby the effect of discharge of a large quantity of hot air can be suppressed, but it would be desirable if the discharge could be avoided entirely.

Some further disadvantages associated with the use of bleed air from an aircraft's engine(s) arise from the fact that the pressure of the bleed air varies as the engine compressor speed varies and/or as the aircraft's altitude changes. Such variations in pressure could cause operational problems if air conditioning apparatus is subjected to them. Hence there is a requirement for pressure reducing/regulating valves for supplying a generally constant (within operating limits) pressure downstream. Such pressure regulating valves are complex and contain sensitive components. The problem is greater if there are multiple engines and the outputs of bleed air therefrom have to be matched.

DESCRIPTION OF THE PRIOR ART

It has been proposed in each of U.S. Pat. No. 3,764,814 and U.S. Pat. No. 5,899,085 to pass bleed air to an external turbine which in turn, drives a power generator, to generate electrical power for use in the aircraft in an effort to increase the efficiency of the system, but these proposals do not suggest how to accommodate variations in the pressure of the bleed air arising due to changing operational conditions.

SUMMARY OF THE INVENTION

According to one aspect of the present invention, we provide a method of conditioning a supply of bleed air from an aircraft engine to a system using such bleed air, including passing the bleed air to a turbine over which the air is expanded to produce a power output, and regulating the power output thereby to control the condition of the air downstream of the turbine.

Thus by regulating the power output, irregularities in the bleed air pressure are prevented or the effect of them in the system in which the bleed air is to be used, is reduced.

Preferably an electrical generator is driven by the turbine. Then the electrical power output of the generator can be regulated to control the expansion of the air in the turbine.

Aircraft have complex electrical systems in which electrical power thus generated can be utilised. However, it would be within the broadest aspect of the invention if the turbine were to drive an hydraulic pump for example, whose power output could be utilised in an aircraft's hydraulic system.

The method of the invention may include sensing at least one parameter of the air downstream of the turbine and changing a load on the power output depending upon the sensed parameter thereby to regulate the condition of the air.

The system in which the bleed air may be used may be an air cycle air conditioning system and the bleed air is expanded and cooled as the bleed air passes over the turbine and may thus be used to cool a heat load.

According to a second aspect of the invention, we provide apparatus for conditioning a supply of bleed air from an aircraft engine to a system utilising such bleed air, the apparatus including a turbine providing a power output as a result of expansion of the air, and a controller for regulating the power output and thereby controlling the condition of the air downstream of the turbine.

Preferably the turbine drives an electrical generator, an electrical load on the generator being regulated by a controller in response to at least one parameter of the air downstream of the turbine.

Preferably the sensor for providing an input to the controller is responsive to one or more parameters including, but not limited to, turbine speed, turbine inlet temperature, turbine inlet pressure, turbine outlet pressure, turbine outlet temperature, the controller responding to the or one or more of the inputs by regulating the electrical load to increase or decrease turbine speed so that the pressure of air downstream thereof is maintained in a generally steady state.

The controller may also be responsive to signals relating to operational conditions, such as flight parameters, of which change would result in a change in the operating state of the engine or engines. Thus the controller may integrated with an engine control system and/or an aircraft control system.

There may be a bypass through which at least a proportion of the bleed air can pass to the system where it is to be used other than by way of the turbine or other expansion device. The proportion of bleed air passing through the bypass may be determined by a valve whose operation preferably also is controlled by the controller.

BRIEF DESCRIPTION OF THE DRAWING

Embodiments of the invention will now be described by way of example with reference to the accompanying drawing, which illustrates diagrammatically an apparatus in accordance with the invention for carrying out the method thereof.

DESCRIPTION OF THE PREFERRED EMBODIMENTS

Figure 1:
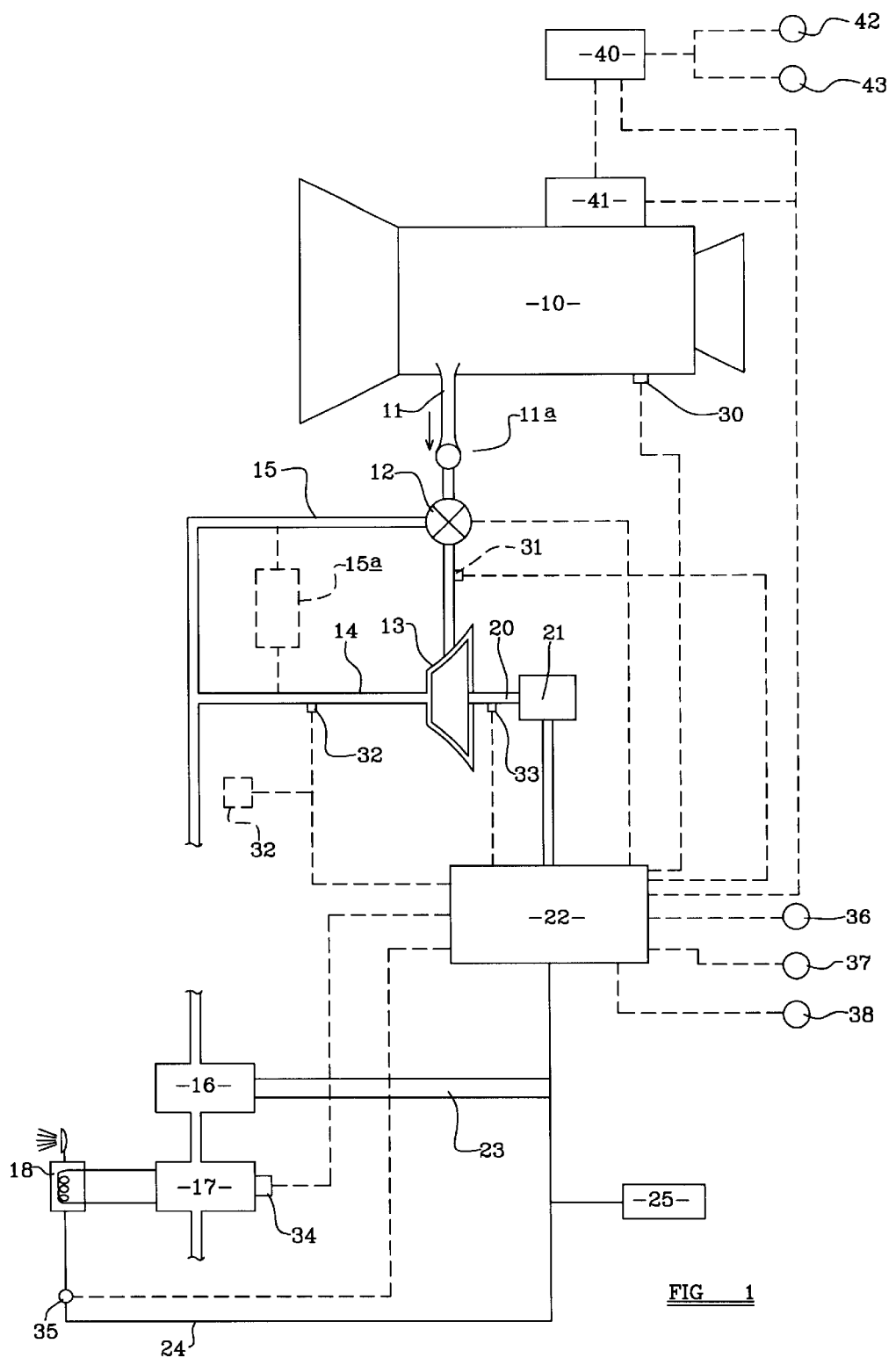

In the drawing, an aircraft engine is indicated at 10 and it is provided, in known manner, with an outlet 11 for bleed air, i.e. air taken from that compressed by the or a compressor stage of the engine prior to delivery thereof to the engine's combustion section. Such air is at a relatively high pressure and in consequence of its compression its temperature has been raised. The bleed air passes from the engine outlet 11 by way of a non-return valve 11a to a temperature control valve 12 which provides for the air to pass through an expansion turbine 13 having an outlet 14 and/or to bypass the turbine 13 by way of a bypass line 15. The turbine outlet 14 and bypass line 15 meet to provide air under required temperature and pressure conditions to, for example, an air conditioning system indicated generally at 16 which includes a heat exchanger 17 which may for example be a cooling device for cooling a coolant which is circulated around components of a radar apparatus, or other heat load, indicated diagrammatically at 18. From there the air may be otherwise used, partially recycled and/or ejected to the ambient atmosphere in any known manner.

In a modified embodiment, the bypass line 15 may included a heat exchanger, as indicated in dotted lines at 15 in the figure, so that the bypass air may be cooled, for example by ram air acting as a coolant in the heat exchanger 15a. In this modified embodiment, the sensor indicated at 32 in the drawing, the function of which will be described below may need to be alternatively positioned, for example in the position indicated in dotted lines.

The turbine 13 is preferably a radial flow turbine having a peripheral inlet and central axial outlet, with a wheel which preferably is of an aluminium alloy on account of its low density, the compressed and hot bleed air in use flowing over the turbine 13 causing the turbine to rotate, whilst the air is permitted to expand and thus cool. The turbine 13 may be of other materials e.g. a suitable steel or a ceramic material, as may be necessitated by the high temperature of the bleed air. The turbine 13 may have an inlet nozzle of fixed or variable geometry.

The turbine has an output shaft 20 which is connected to an electrical generator 21, and the electrical output from the generator 21 is delivered to a control and power regulating controller 22 which may be integrated with an engine 10 or aircraft control system if desired. Electrical power distribution lines extend from the controller 22 to wherever electrical power generated by the generator 21 may be consumed in the aircraft; by way of example power lines to the air conditioning system 16 are indicated at 23 and to the radar apparatus 18 at 24. An electrical storage battery is indicated at 25.

In operation of the apparatus, the bleed air which is expanded as it passes over the turbine 13 has its pressure and temperature reduced. By way of example, the pressure may drop to the order of 30-100 psig, dependent on what use the air may be put to downstream of the turbine 13. The extent to which the air is expanded and thus cooled over the turbine 13 is controlled by regulating the electrical load on the generator 21 and this regulation is performed by the controller 22.

The controller 22 may be operated in response to any number of operating parameters of the apparatus and/or of the engine 10 and/or the aircraft. The drawing shows sensors as follows whose electrical output signals are provided to the control and regulating means 22:

a sensor 30 measuring engine speed (rpm), a sensor 31 measuring air pressure and/or temperature at the inlet to the turbine 13, a sensor 32 measuring temperature and/or pressure at the outlet of the turbine 13, a sensor 33 measuring turbine/generator shaft speed, a sensor 34 measuring the temperature at an appropriate position in relation to the heat load 17, a sensor 35 measuring electrical power consumption of the radar apparatus 18, The above sensors are indicated by way of examples and other parameters associated with operation of the system and not necessarily all those mentioned above. Further parameters which may be sensed and used in control of the apparatus may include, by way of example, aircraft surface temperature (sensor(s) 36); ambient air temperature (sensor 37) and ambient air pressure (sensor 38).

The controller 22 may in addition be responsive to one or more signals derived from a flight control system of the aircraft and/or a control system for the aircraft's engine(s). In the drawing an aircraft control system is indicated diagrammatically at 40, responsive to manual flight control input signals as indicated at 42 and automated flight control input signals as indicated at 43. An engine control system is indicated diagrammatically at 41. Signals from both these control systems are provided to the control means 22 to be utilised as required in regulating the electrical load on the generator 21 and thus controlling the expansion of the bleed air in the turbine 13. The signals from sensors 36–38, and the flight input signals 42, 43, enable the requirements for cooling air to be predicted to some extent and thus facilitate control of the conditioning of the bleed air to meet such requirements.

The controller also controls the valve 12.

Thus, in principle, the invention provides that the electrical load on the generator 21 is regulated by the controller 22 to increase or lower the speed of the turbine and maintain its outlet pressure in a generally steady state regardless of the operating conditions of the engine 10. This principle of operation and the apparatus above described may be at the heart of an integrated air conditioning management system for an aircraft with one or a number of engines, which would enable predicted heat load requirements to be responded to in a better manner than is presently possible. The power consumed by electrical and electronic equipment may be taken into consideration to help calculate predicted heat loads, and aircraft surface temperatures and ambient temperatures may also be taken into consideration.

In the case where an aircraft has two or more engines, a respective turbine arrangement for conditioning of the bleed air may be provided for each engine. The respective power outputs of the generators associated with respective turbines may be regulated separately so as to balance and match them as required.

Possibly the expansion of the bleed air could take place in successive turbines to provide two (or more) stage expansion, and two different temperature/pressure supplies of conditioned bleed air could thus be obtained yet a further possibility is that expansion could take place in turbines in parallel with one another.

Although a simple heat load has been referred to at 17, 18, it would be possible that one or more air or vapour cycle cooling systems could be arranged to use conditioned air supplied in accordance with the invention. The invention may have elements in common with and/or integrated into such systems, and a common control system could be used.

If insufficient bleed air pressure is available from the engine to satisfy heat load demands, a compressor (not shown) may be operated by energy derived from operation of the engine, and/or by battery power and/or other electrical power sources, e.g. fuel cells. Thus ambient air may supplement the bleed air to cool the heat load.

Finally it is pointed out that, although the invention is described above in relation to an aircraft, aircraft engines can be used for other means of transport or indeed for other purposes. Reference herein to an aircraft engine should not be construed as limiting the invention in its broadest aspects to its use in aircraft.

What is claimed is:

1. A method of conditioning a supply of hot pressurized bleed air from an aircraft engine prior to providing the bleed air to a downstream air cycle air-conditioning system, the method including passing the hot bleed air to a turbine over which the bleed air is expanded to produce a power output, and regulating the power output thereby to control the condition of the air downstream of the turbine.

2. A method according to claim 1 wherein an electrical generator is driven by the turbine.

3. A method according to claim 2 wherein an electrical power output of the generator is controlled to regulate the expansion of the air in the turbine.

4. A method according to claim 1 which includes sensing at least one parameter of the bleed air downstream of the turbine and changing a load on the power output depending upon the sensed parameter thereby to regulate the condition of the bleed air.

5. A method according to claim 1 wherein the bleed air is expanded and cooled as the bleed air passes over the turbine and used to cool a heat load.

6. Apparatus for conditioning a supply of hot bleed air from an aircraft engine prior to providing the bleed air to a downstream air cycle air conditioning system, the apparatus including a turbine providing a power output as a result of expansion of the hot bleed air over the turbine, and a controller for regulating the power output and thereby controlling the condition of the bleed air downstream of the turbine.

7. Apparatus according to claim 6 wherein an electrical generator is driven by the turbine, an electrical load on the generator being regulated by a controller in response to an input from a sensor sensing at least one parameter of the bleed air downstream of the turbine.

8. Apparatus according to claim 6 further including a bypass though which at least a proportion of the bleed air can pass to the system where it is to be used other than by way of the expansion device.

9. Apparatus according to claim 8, wherein the proportion of the bleed air passing through the bypass is determined by a valve whose operation is controlled by the controller.

10. Apparatus for conditioning a supply of bleed air from an aircraft engine to a system utilising such bleed air, the apparatus including a turbine providing a power output as a result of expansion of the bleed air, and a controller for regulating the power output and thereby controlling the condition of the bleed air downstream of the turbine, wherein an electrical generator is driven by the turbine, an electrical load on the generator being regulated by a controller in response to an input from a sensor sensing at least one parameter of the bleed air downstream of the turbine, and wherein the sensor for providing an input to the controller is responsive to one or more parameters including turbine speed, turbine inlet pressure, turbine inlet temperature, turbine outlet pressure, and turbine outlet temperature, the controller responding to the one or more inputs by regulating the electrical load to increase or decrease turbine speed so that the pressure of bleed air downstream thereof is maintained in a generally steady state.

11. Apparatus according to claim 10, wherein the controller is further responsive to signals relating to operational conditions of the aircraft and/or an engine or engines thereof.

12. A method of conditioning a supply of hot pressurized bleed air from an aircraft engine prior to providing the bleed air to a downstream air cycle air conditioning system, the method including passing the hot bleed air to a turbine over which the bleed air is expanded to produce a power output, and regulating a load on the power output of the turbine to control the temperature of the air at a location downstream of the turbine.

* * * * *